United States Patent [19]

Kline et al.

[11] Patent Number: 4,464,543

[45] Date of Patent: Aug. 7, 1984

[54] NETWORK CONTROL CENTER CALL TRACE

[75] Inventors: Samuel J. Kline, Sherborn; Richard E. Little, Dedham, both of Mass.

[73] Assignee: GTE Business Communication Systems Inc., Waltham, Mass.

[21] Appl. No.: 445,866

[22] Filed: Dec. 1, 1982

[51] Int. Cl.³ .................. H04M 15/26; H04M 15/32
[52] U.S. Cl. ............................. 179/8 R; 179/18 FH; 340/734; 340/286 M
[58] Field of Search ............ 179/8 R, 18 FH, 18 EA, 179/18 B, 27 FH, 27 FF, 175.2 C, 5 R, 2 A, 7.1 R, 7.1 TP, 8 A; 340/734, 286 M, 525, 27, 24

[56] References Cited

U.S. PATENT DOCUMENTS 3,651,269 3/1972 Le Strat et al. ............... 179/8 R X Primary Examiner—Stafford D. Schreyer
Attorney, Agent, or Firm—J. Stephen Yeo

[57] ABSTRACT

A telecommunication network has a plurality of tandem node switches interconnected by trunks. Each switch generates message detail records (MDR) which are transmitted by data links to a network control center. In response to complaints, an NCC operator can start a mechanized search of MDR to retrace the path a call had earlier taken. The retraced path may be graphically illustrated on a display network map. Data from each call trace may be stored in a call trace log for subsequent retrieval.

15 Claims, 19 Drawing Figures

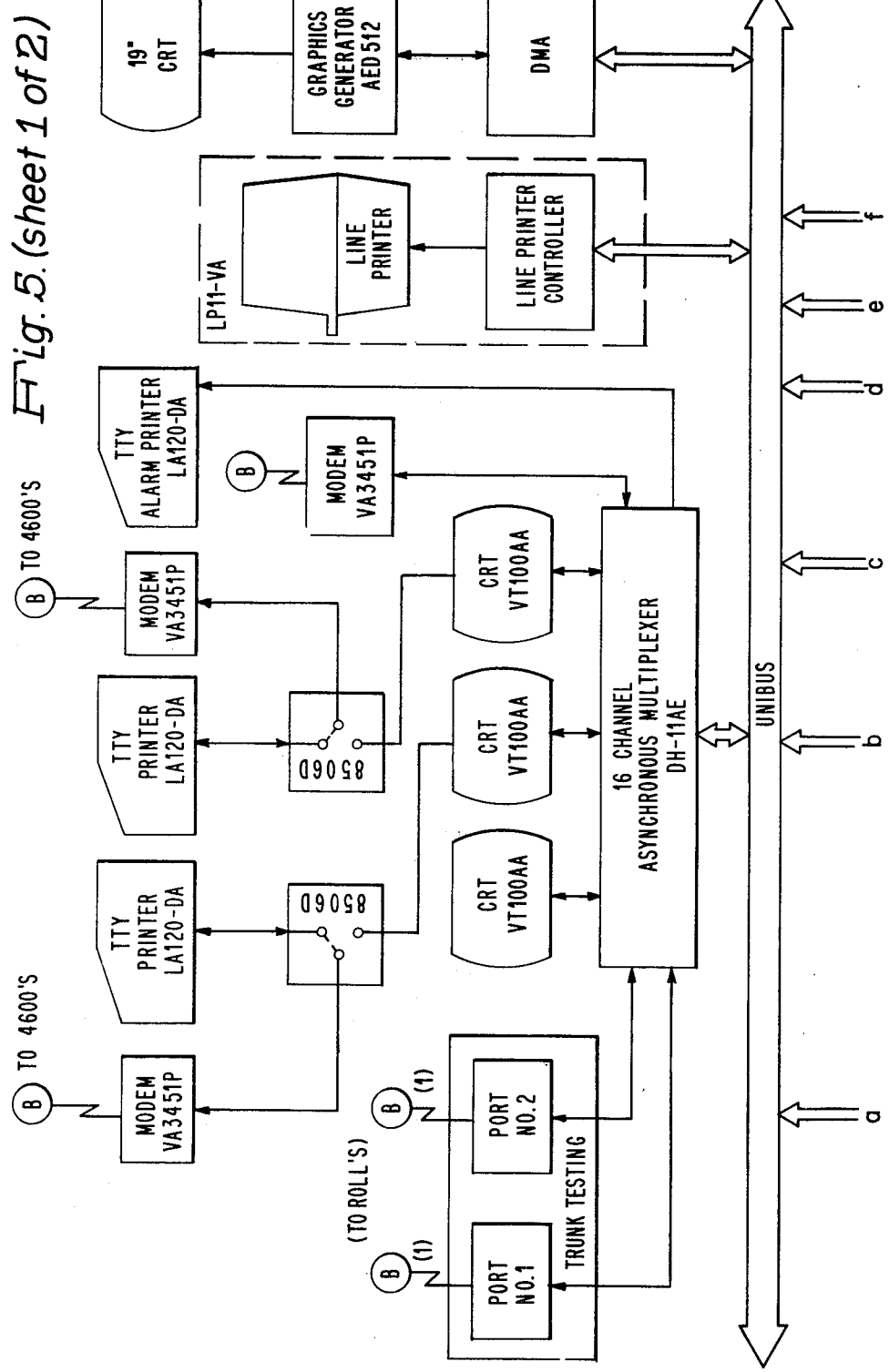
Fig. 5 (sheet 1 of 2)

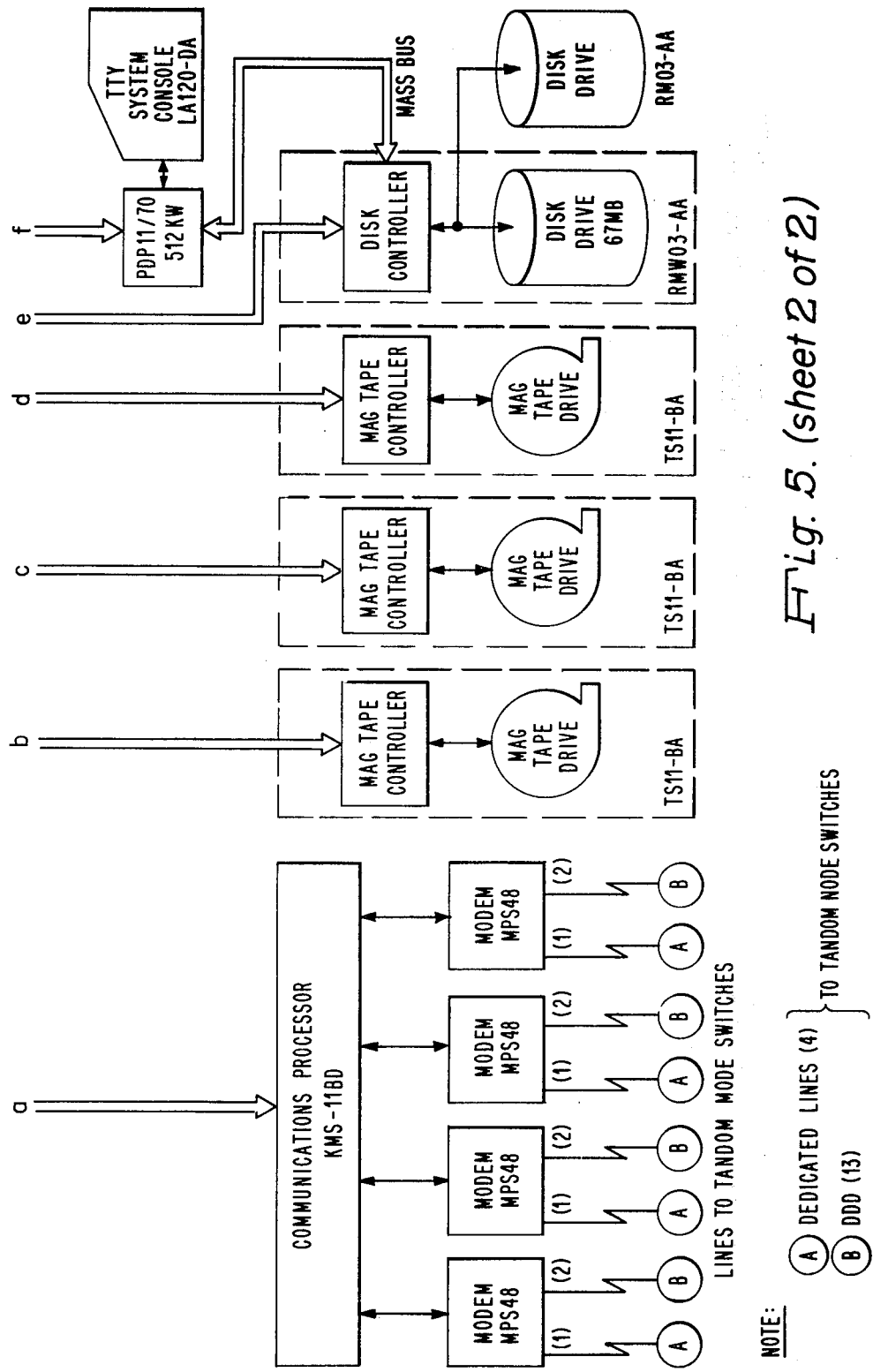
Fig. 5. (sheet 2 of 2)

NOTES:
1. COLOR REFERS TO GRAPHICS DISPLAY SYMBOL
2. ACKNOWLEDGEMENT WILL RETIRE ALL UNACKNOWLEDGED ALERTS FROM A GIVEN SOURCE

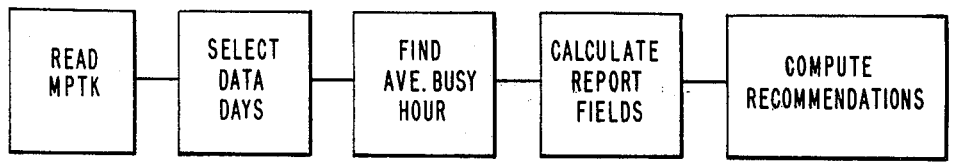

Fig. 16.

```
1........10.......20.........30........40.........50........60........70
```
                                                    TRAFFIC MEASUREMENT S

SWITCH X          FROM d-mmm-y to d-mmm-y

```
                           ----------------------------- AVG BUSY HOUR--
TRK   NUM  AV B  __USAGE__  CAR'D  OFR'D  -OUTGOING--   AVG    ---------
GRP   TKS  HOUR  INC   OUT  LOAD   LOAD   ATMPS  OVFL  BLKG   ATMPS  OVFL

XXXX  XXX  XXXX  XXXXX XXXXX XXXXX XXXXX XXXXX XXXXX XXXXX XXXXX XXXXX
 .     .    .     .     .     .     .     .     .     .     .     .
 .     .    .     .     .     .     .     .     .     .     .     .
 .     .    .     .     .     .     .     .     .     .     .     .
```

Fig. 17a.

```
70........80.........90.........100.........110.........120.........130...
```
SUMMARY REPORT                                             d-mmm-y
                                                                    PAGE XXX

```
       ---- QUEUE -----------   BLKG
          ---ABND---            /DLY    --HOURS--    --RCMD--
USAGE  OH    RB    TMOTS   DLY  TRGT    ABOVE TRGT   ADD/RMV   EQN
                                        -2M -1M CM   -2M-1M CM

XXXXX XXXXX XXXXX XXXXX XXXXX  XXXX     XX  XX  XX   XX  XX XX   X
  .     .     .     .     .     .       .   .   .    .   .   .   .
  .     .     .     .     .     .       .   .   .    .   .   .   .
  .     .     .     .     .     .       .   .   .    .   .   .   .
```

Fig. 17b.

NETWORK CONTROL CENTER CALL TRACE

FIELD OF THE INVENTION

This invention is concerned with telecommunication networks and, more particularly, is concerned with control centers for such networks.

CROSS REFERENCE TO RELATED APPLICATIONS

Co-pending U.S. patent application Ser. No. 439,470, filed Nov. 5, 1982, for "Private Interconnect Network" is directed towards a tandem switching network.

The following co-pending U.S. patent applications pertain to other features of a network control center.

Ser. No. 446,072, filed concurrently herewith in the name of Jonas R. Bielkevicius, entitled "Network Control Center Alarm Message Detector".

Ser. No. 445,867, filed concurrently herewith in the name of Richard E. Little, entitled "Telecommunication Network Display System".

Ser. No. 445,868, filed concurrently herewith in the name of Samuel J. Kline, entitled "Network Control Center Trouble Ticket".

Ser. No. 445,863, filed concurrently herewith in the name of Samuel J. Kline, entitled "Telecommunication Trunk Circuit Reporter and Advisor" now U.S. Pat. No. 4,456,788.

Ser. No. 445,861, filed concurrently herewith in the name of Richard E. Little, entitled "Internodal Conference Call Administrator" now U.S. Pat. No. 4,455,455.

REFERENCE TO RELATED PUBLICATIONS

A detailed description of the GTD-4600 exchange referred to herein will be found in a paper entitled "Evolution of the GTD-4600 PABX Tandem Switching System" given at the National Telecommunications Conference in New Orleans on Dec. 3, 1981. The last portion of this paper provides a list of additional published references concerning the GTD-4600.

The telecommunication network described herein is described in more detail in a paper given at the same conference and on the same date given above and entitled "Private Interconnect Networks Overview".

The network control center disclosed herein is described in another paper entitled "Network Control Center" and given at the same conference and on the same date given above.

Additional papers describing the network control center and the connections between the exchanges and the center have been published in the GTE Automatic Electric World Wide Communications Journal, January-February 1982. Titles of these papers are as follows: "Network Control Center Interface for the GTD-4600 Tandem Switch Enhancement" and "GTD-4600 Tandem Switching and Feature Enhancements".

The contents of all of these papers and the list of references identified above are incorporated by reference herein.

BACKGROUND OF THE INVENTION

Medium to large corporations and governmental agencies may have a number of locations scattered across the country. The amount of voice and data information to be rapidly transferred between locations is increasing each year. This increase in transferred information coupled with increased rates charged by common carriers has caused many users to purchase or lease private telecommunication networks. These networks may include network control centers which provide important network administration, control, and maintenance functions.

SUMMARY OF THE INVENTION

In one aspect of the invention, a telecommunication system has a plurality of tandem node switches which generate and transmit message detail records to a network control center where they are stored. A mechanized call trace system searches the database for records pertaining to the circuit path a call had taken. Relevant message detail records are listed, in effect tracing the circuit taken by a particular call.

As an additional aspect of the invention, a graphical representation of the route the traced call took through the network may be displayed.

BRIEF DESCRIPTION OF THE DRAWINGS

In the drawings:

FIGS. 5-1 and 5-2 is a more detailed diagram of the NCC;

FIG. 7 shows an arrangement for storing and reporting message detail records at the NCC;

FIG. 16 is an information flow diagram of the traffic analysis feature; and

FIGS. 17a and 17b is an example of a traffic management report format.

For a better understanding of the present invention, together with other and further objects, advantages and capabilities thereof, reference is made to the following disclosure and appended claims in connection with the above-described drawings.

DESCRIPTION OF THE INVENTION

I. Overview of Network

Figure 1:
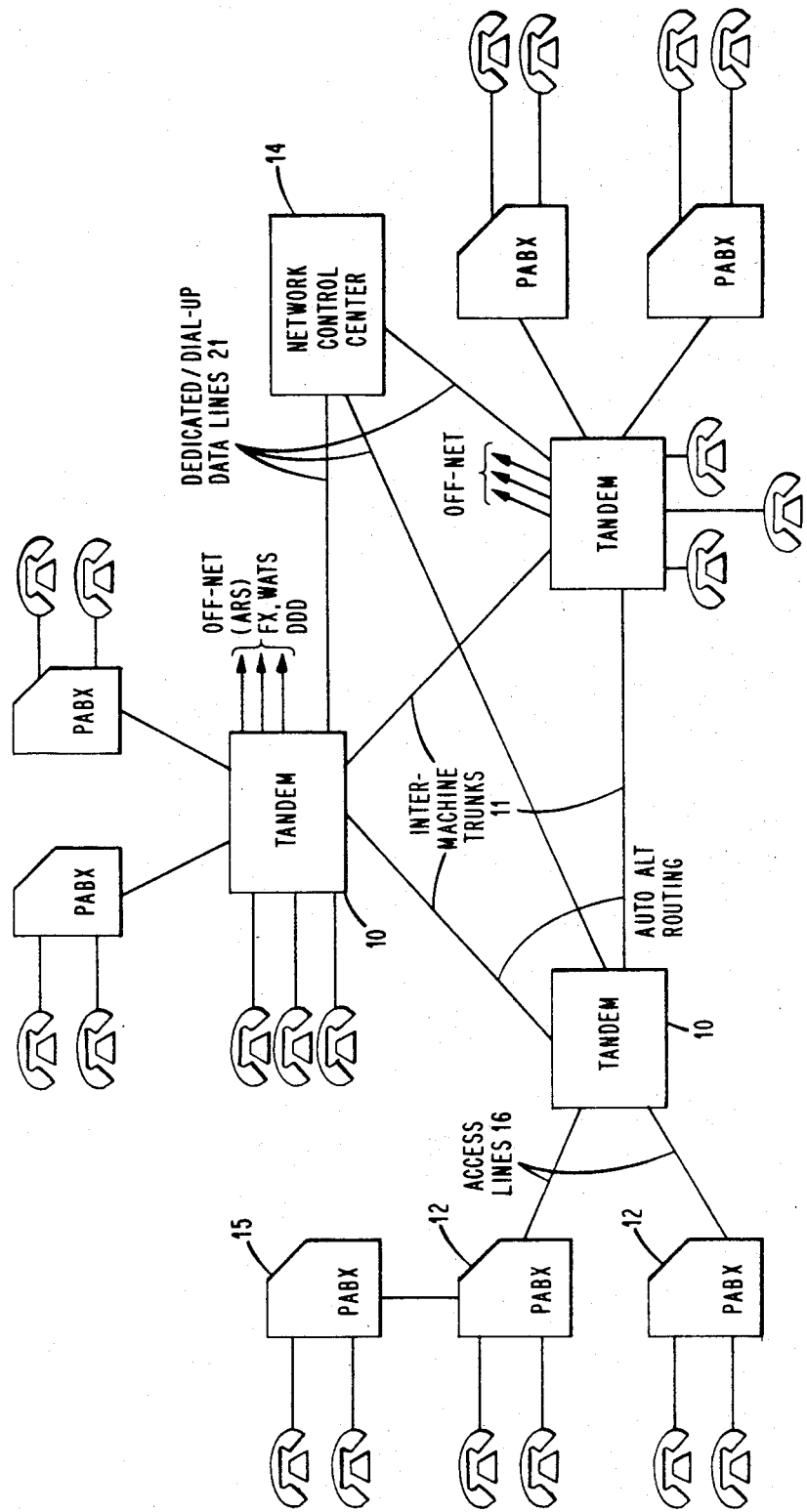
FIG. 1 is a block diagram of a tandem node telecommunication network including a network control center (NCC)

FIG. 1 shows an example of a private telecommunication network configuration. Several tandem node switches 10 serve as traffic concentrators and are used to direct traffic through the network. The tandem node switches are interconnected by intermachine trunks 11. These tandem node switches are generally located at the customer's major locations and may also provide private automatic branch exchange (PABX) capability. Since the tandem node switch generally provides major tandem capability and serves the stations at major locations, these switches must have a capacity to serve thousands of stations and hundreds of trunks (intermachine, access lines, and off-net). Satellite PABXs 12 are homed to one or more tandem node switches by access lines 13. Traffic to locations not served by the network is called off-net traffic and is served by common carriers on the public networks.

The private network configuration also includes a centralized network control center (NCC) 14, which provides network administration, control, and maintenance functions.

Each tandem node switch 10 may serve a large geographical area. The access lines 13, the intermachine trunks 11 and off-net facilities are leased from common carriers. Mixtures of satellite and terrestrial circuits are available.

One such tandem node switch is the GTD-4600-TSE manufactured and sold by GTE Corporation. This switch can function as a large PABX utilizing a digital network as well as function as a tandem node in a private interconnect telecommunication network. The tandem node switch can be configured to have one or more customer groups as mains. These mains can be stand-alone switches or can have subtending satellite PABXs 12 or tributary PABXs 15. Each main can also have any or all of the features of a tandem node switch and may or may not be part of the network served by the tandem node customer group.

The network can process both private and public dialing. In the case of public dialing, a route will be established through the network to the closest location to the dialed number and the call dropped off the private network to the public network at that point.

The network dialing plan consists of a seven digit code. The first three digits are a unique RNX code which determines the locations of the main within the network. The remaining four digits are the station number of the party dialed and correspond to his extension number or the listed number of the PABX. Within a main/sat/trib complex, each satellite and/or tributary can have a unique RNX code or may have the same RNX code as the main. If an entire main/sat/trib complex has the same RNX code, then the four digit station number or the listed number must be unique within that main/sat/trib complex.

The tandem node switch also processes on-network ten digit calls. Based on the area and office codes dialed, the closest tandem node will be selected by a translator and a route established through the network until the last tandem node is reached. The last tandem node will outpulse off-net either seven or ten digits, depending upon the NPA area.

In addition to network routing and translation functions of a tandem node switch, it has network control features which dynamically control the routing and translation, and for providing information on the level and type of traffic through the switch. These controls can be activated via either the network control center (NCC) or a designated local control terminal at each switch. Features such as trunk direction, dynamic route, time-of-day override and code blocking are all used to dynamically alter the routing and translation capabilities of the tandem node switch. Short register timing changes the holding time for receivers while station message detail recording (MDR), traffic data recording and 100 second trunk data provide periodic messages to the NCC for use in determining traffic data.

Centralized administration and maintenance is accomplished by providing the tandem node switch with a high speed data link interface to the network control center (NCC) 14. The data link interface provides transmission and processing of such data as 100 second update of trunk data, traffic data, message detail recording (MDR), as well as the other maintenance and administration information previously provided locally. There is a need to send considerable amounts of full period data, the transmission of which requires framing, error checking, retransmission for error conditions, and a number of other communications tasks which require the tandem node switch to include a network control interface (NCI) which includes software and a communications front end 17 seen in FIG. 2.

The NCI provides the centralized administration and maintenance features associated with interfacing the corresponding tandem node switch with the network control center.

The NCI is structured around standard data communications protocol levels. A modem interface (level 1) was chosen as EIA RS232C. The transmission protocol (level 2) is a subset of HDLC/SDLC (the X.25 transmission level 2 protocol). Since full period point-to-point circuits are required, a data switching level is not used. Therefore, the next level is an application dependent protocol established between the tandem node switch and the NCC. This level is implemented entirely in software and runs on the communications front end (CFE) 17.

Figure 2:
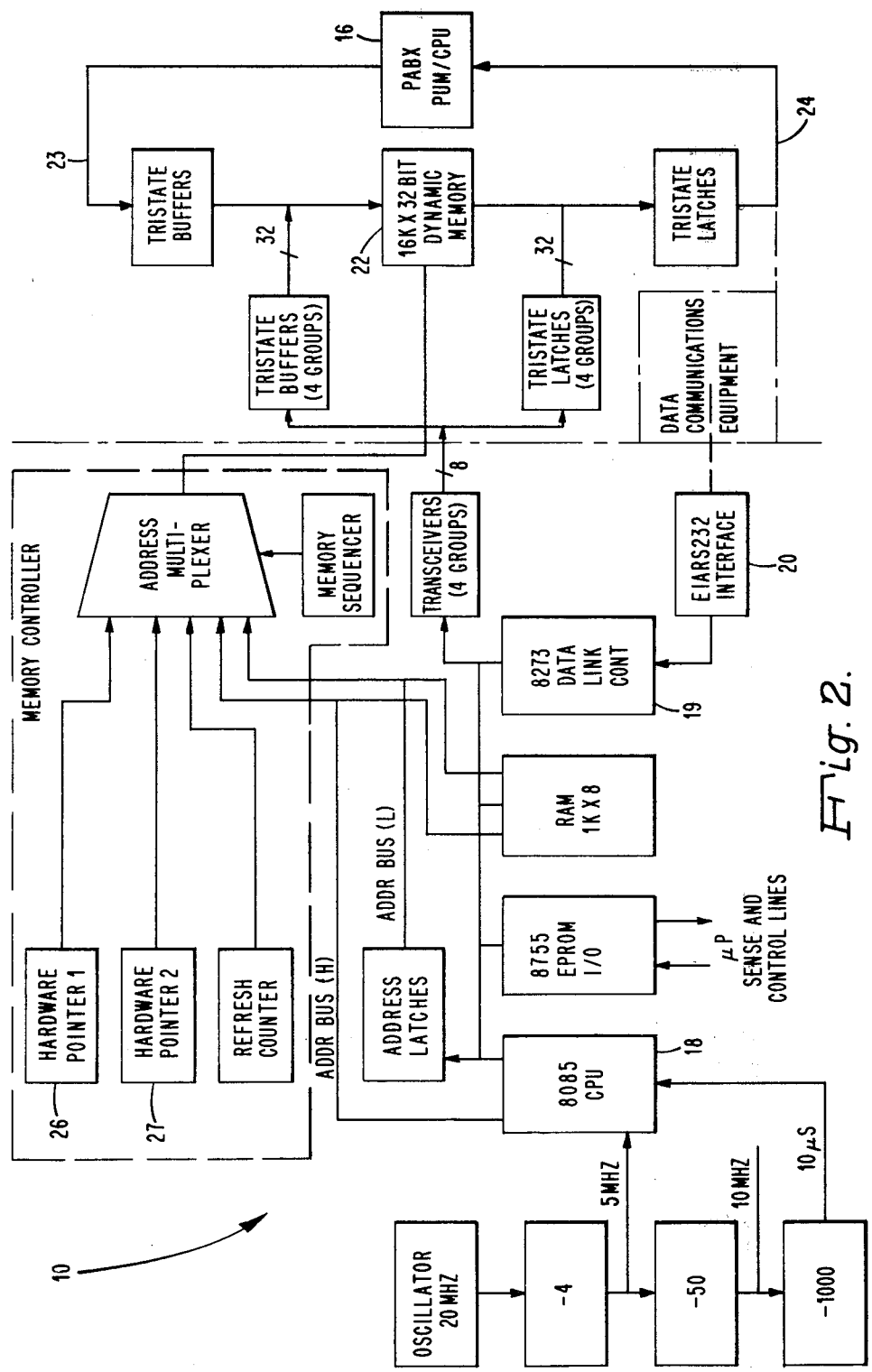
FIG. 2 is a block diagram of a circuit for interfacing a tandem node switch with the NCC.

A brief overview of the GTD-4600-TSE hardware as seen in FIG. 2 should serve to better understand the network control interface (NCI). The GTD-4600-TSE 10 is a central processor based PABX with tandem switch enhancement which utilizes a general purpose sense and control structure termed the peripheral unit matrix (PUM) 16 to address the peripheral hardware. The entire complex is duplex for high reliability. There are a variety of peripherals associated with the system such as the input/output (I/O) interface, telephony circuit interfaces, and network control interfaces. The switch has a fully duplex digital network.

The network control requirements are partitioned from the primary function of the switch. These requirements, having a major real-time impact, allow the use of distributed processing. This is achieved in hardware by the addition of the communications front end (CFE) 17 as part of the I/O facilities of the GTD-4600-TSE.

An Intel 8085 controller serves as the main CFE microprocessor 18. An Intel 8273 programmable HDLC/SDLC protocol controller 19 interfaces a data link modem by means of an EIA RS232C driver and receiver 20.

Figure 3:
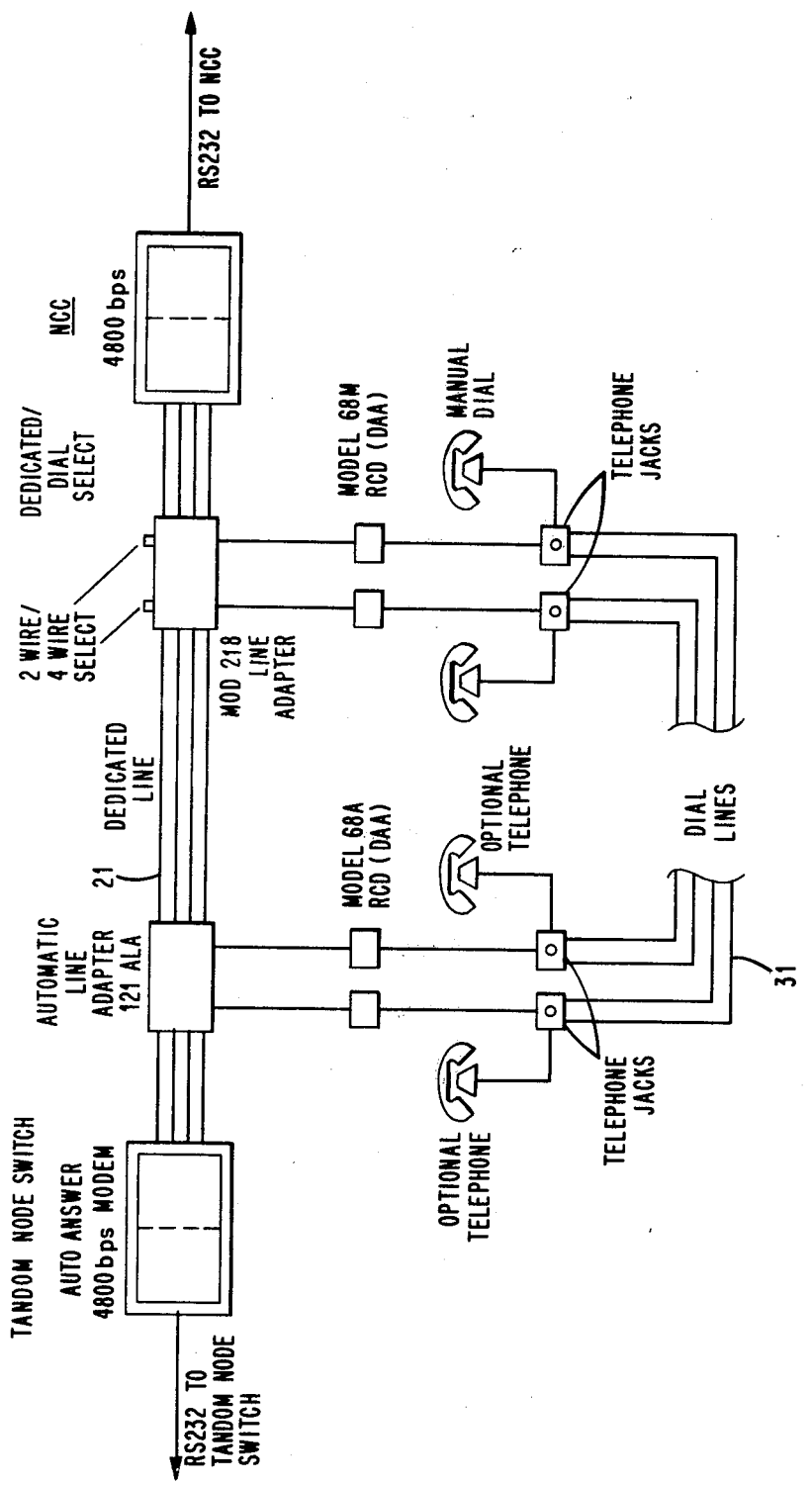
FIG. 3 shows modems and dedicated lines coupling a tandem node switch and the NCC.

The modem configuration between the tandem node switch and the NCC is illustrated by FIG. 3. Communication between the tandem node switch and the NCC is through dedicated 4-wire 4800 b/s data links 21. The data link protocol is the International Telephone and Telegraph Consultative Committee (CCITT) specified LAP-B.

Referring again to FIG. 2, a unique 16K by 32 bit "common memory" arrangement 22 is configured to accommodate the 32 bits bus of the GTD-4600 and the 8 bit bus of the CFE microprocessor 18.

The "common memory" functions are to buffer messages received from (or sent to) the data link, provide program store and provide interprocessor communications between the GTD-4600 central processing unit (CPU) and the CFE microprocessor 18. The system hardware to permits the GTD-4600 to write into the "common memory" via the peripheral control interface (PCI) data bus 23, and read from it via the existing PCI return bus 24. Reading or writing of "common memory" by the GTD-4600 CPU is controlled by two hardware pointers 25, 26 in conjunction with specifically selected peripheral matrix words. Auto-incrementing of the hardware pointers occurs on reads or writes to the peripneral matrix words. This permits the GTD-4600 CPU to automatically write (or read) into (or from) any of eight 2K by 32 pages of consecutive addresses of "common memory". The CFE microprocessor 18 views the same memory as a 64K by 8 RAM within its addressing range and as such, can contain executable code.

II. Overview of Network Control Center

Figure 4:
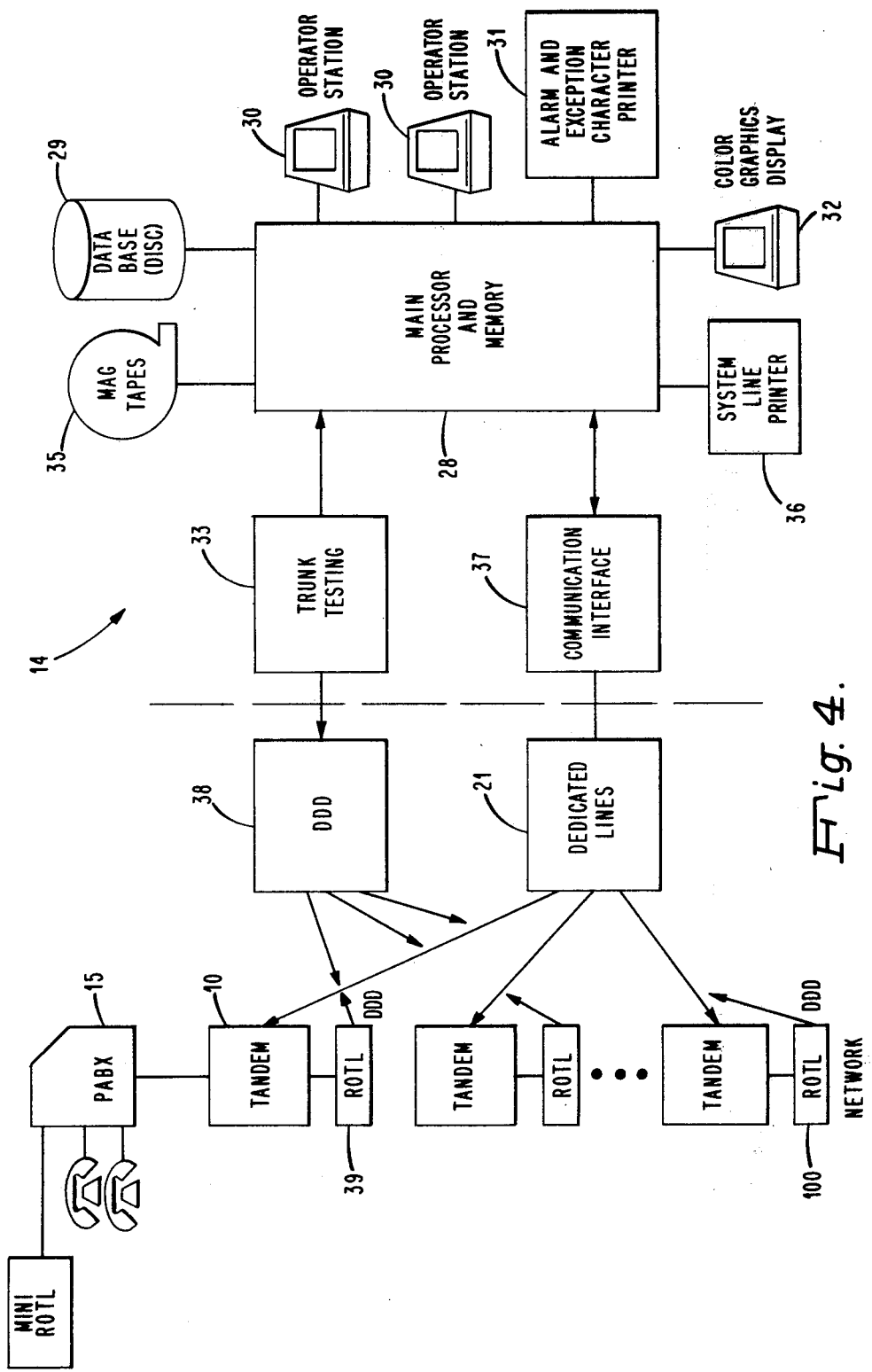
FIG. 4 is a block diagram of the NCC.

FIG. 4 is a block diagram of the physical layout of a network control center (NCC) 14 for practicing the invention. FIG. 5 is a functional block diagram of the NCC.

The network control center is a stand-alone facility, and need not be co-located with a tandem node switch, nor for that matter housed at a location connected into the network. Thus, the network control center may be located to accommodate administrative concerns rather than technical constraints.

Physically, the NCC consists of a main processor and memory 28, disc 29, operator terminals 30, alarm and exception character printer 31, dynamic color graphics display 32, remote trunk testing system 33, magnetic tapes 35, system line printer 36 and data-link communications interface 37.

The main processor and memory 28 is based on a microcomputer such as the Digital Equipment Corporation PDP-11 series of minicomputers and can range from the PDP-11/34 to the PDP-11/70, depending on network characteristics. The main processor, memory, disc and operator terminals accommodate the data manipulation, intermediate storage and human interface necessary to support the central control functions. The color graphics display 32 provides a real-time, global view of network traffic and switch equipment status. The trunk test system 33 consists of software on the NCC computer and communications hardware that transmits control signals via direct distance dialing (DDD) lines 38 to remote office test lines (ROTLs) 39 located at switch sites. The line printer 36 is used to output high-volume reports. A character printer, designated as the "alarm and exception" printer 31, outputs messages of critical importance. The magnetic tapes 35 store message detail record (MDR) data and traffic data for processing on a separate computer facility.

The NCC communicates with the tandem node switches using corresponding dedicated, 4-wire, 4800 b/s data links 21 as seen in more detail in FIG. 3. The data link protocol (level 2) is preferably the CCITT specified LAP-B and was chosen for its throughput efficiency, error control and the availability of devices for implementation. This protocol can be enhanced to X.25 to be compatible with public data networks such as that offered by GTE-Telenet Communications Corporation.

In the event of a data link failure, dial-up lines 34 can fully restore functionality. In the event of catastrophic failure at the NCC, simple hardcopy terminals can be connected to switches via the dial-up lines to continue a degraded monitoring and control operation. Network call processing is in no way hampered by the loss of the NCC. In case of a link or NCC failure, MDR data from the tandem node switches are stored on magnetic tape 42 (FIG. 7) at the tandem node switch site, and can be read back to the NCC when the failure has been corrected.

The important NCC capabilities are summarized below:

1. Trunk testing is a tedious manual task and thus often not adequately scheduled. With software and hardware at the NCC, and remote office test lines (ROTLs) at the switches, trunk testing can be scheduled and automatically carried out under NCC control for all inter-machine trunks (IMTs) and satellite PABX access lines. The NCC analyzes the test results and prepares reports showing, for example, which trunks need immediate attention. Trunk testing can also be manually initiated. These capabilities ensure maximum trunk availability and avoid expensive over-dimensioning of network transmission facilities.

2. Switch node maintenance is centralized at the NCC by remoting all tandem node switch craftsperson terminal functions to the NCC. As multiple switches are monitored the volume of maintenance messages and status reports would become overwhelming for manual scanning and, without computerized assistance, important messages would be overlooked. The NCC accepts and stores all switch messages from each network switch, scans them in the process, and alerts the operator immediately when critical messages are detected. Database utility software is provided for later sorting and selective retrieval to make the remaining messages useful. Maintenance costs are reduced and rapid restoral of network service is gained by these capabilities.

3. Network user complaints can provide valuable maintenance information to an NCC operator. The NCC call trace feature provides a capability from an NCC resident database of MDR data to precisely reconstruct the path of any network call. The MDR record format includes identification of incoming and outgoing trunk groups as well as individual circuit identification. Further, other information can be selectively acquired from the MDR database; for example, a specific circuit can be examined for short holding times. These call trace features allow the telecommunication manager to be responsive to user complaints and improve service.

4. Centralized real-time monitoring of network traffic conditions would be virtually impossible without computer assistance. The tandem node switch reports occupancy on each trunk group to the NCC at 100 second intervals. The NCC displays this information using color graphics techniques. When an all-trunks-busy condition persists too long, a threshold report is generated. Such timely information supports effective use of the numerous traffic control features provided by the tandem node switch and controllable from the NCC to mitigate traffic congestion. Optimal service, even during unusual traffic conditions, can be assured.

5. The extensive traffic measurement features of the tandem node switch are designed to accommodate automated centralized traffic data collection at the NCC. The NCC analyzes the traffic data from all nodes in the network, and produces trunk group grade-of-service reports with add/delete-circuits recommendations to meet specified traffic objectives. In addition, traffic data is recorded on magnetic tape for subsequent off-line analysis. These features ensure that the desired grade-of-service is achieved at the lowest transmission costs.

Figure 6:
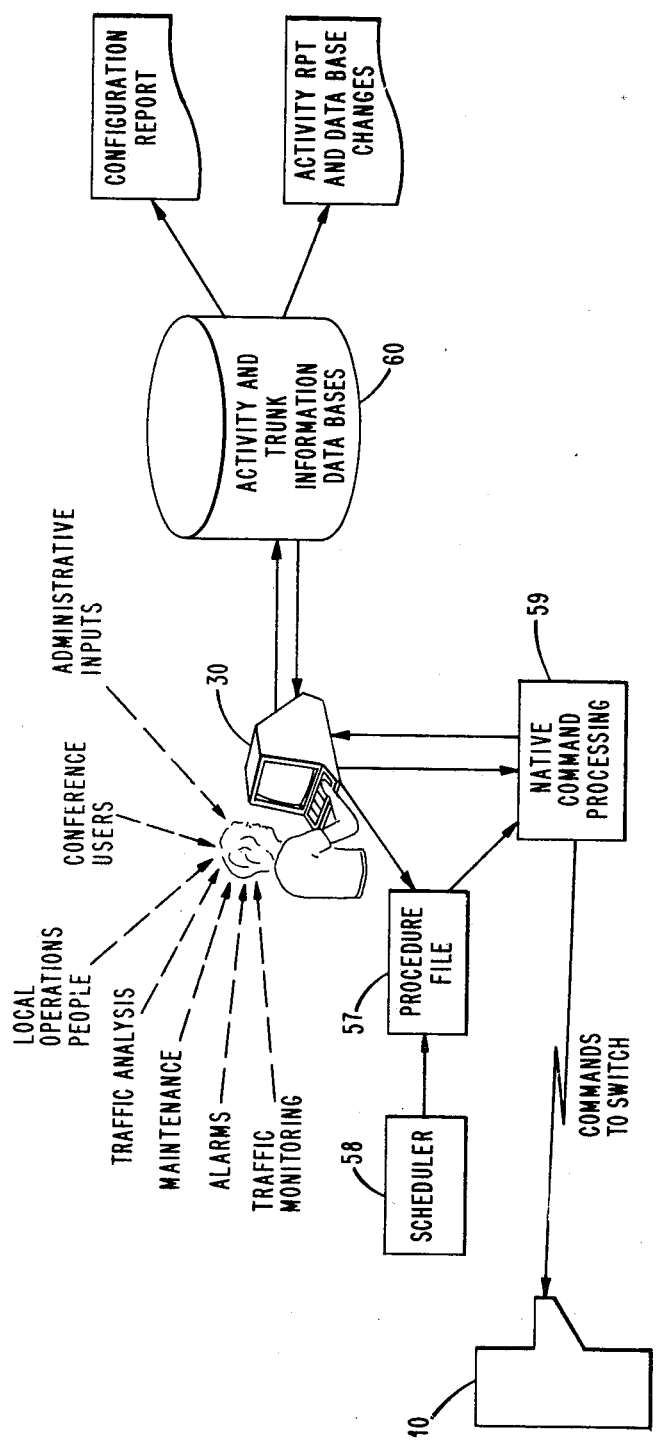
FIG. 6 illustrates the centralized switch control function of the NCC.
Figure 2:
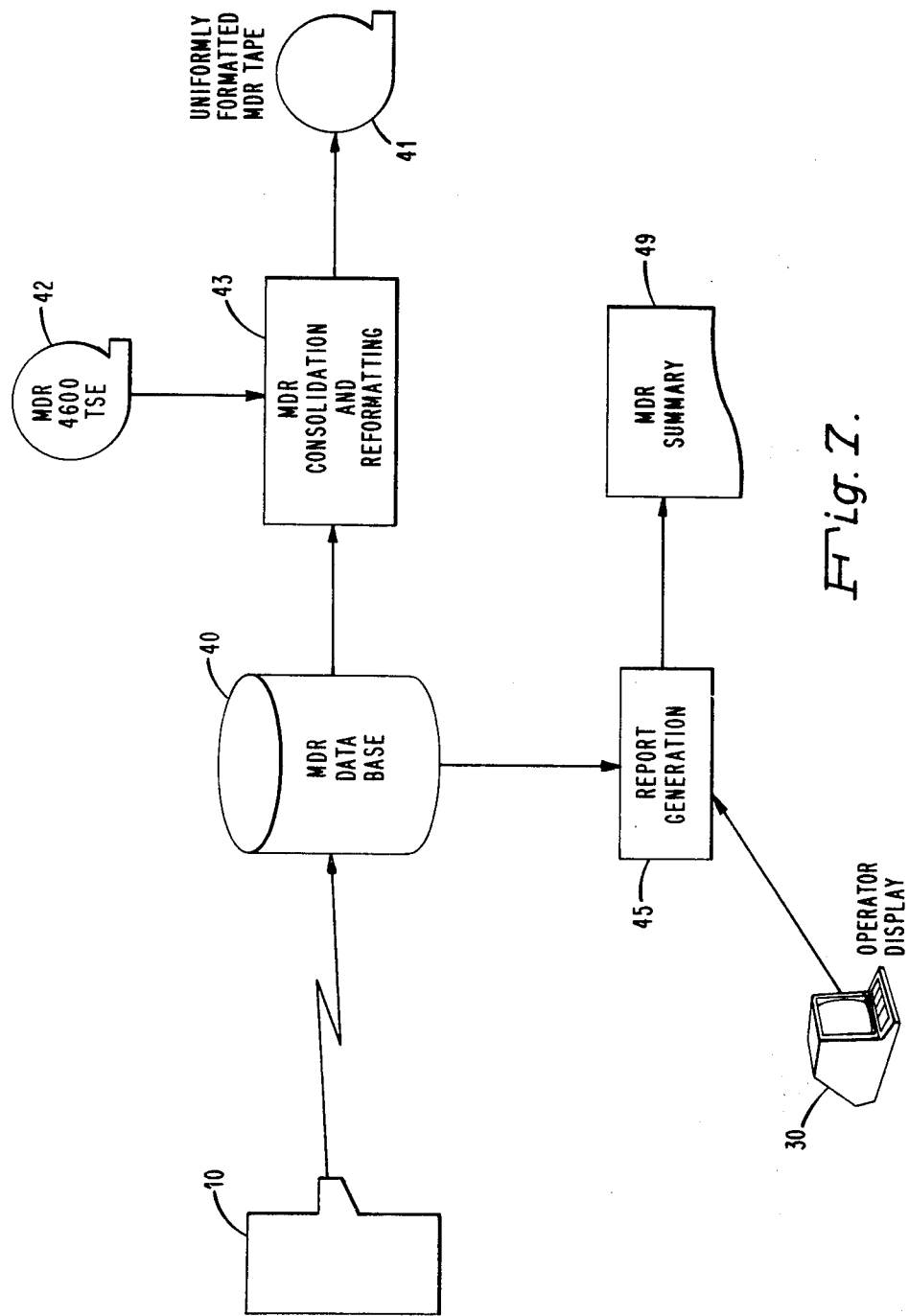

6. By providing for centralized switch database administration, particularly in regard to switch database changes involving network-wide operations or features, the NCC facilitates improved coordination of technical and administrative tasks required for economical, high-quality network operation. FIG. 6 illustrates the centralized switch control of the NCC.

7. The NCC centrally collects all MDR data from all tandem node switches and records the data on magnetic tape for off-line processing. This avoids the operational costs of manual MDR tape collection.

8. The NCC provides management aids to track alarms and trouble reports, and produces summaries of MDR and traffic data. These reports help the telecommunications manager "monitor the pulse" of network activity.

Upon completion of a call which passes through the network, each of the involved tandem node switches creates message detail record (MDR) data which identifies the called number, the incoming and outgoing trunk groups and circuit number, authorization code (if applicable), the data, beginning and completion times, and call disposition. In the case of an originating node, the station on the tandem node switch or the access line from a satellite PABX would be identified. A station on a remote PABX could also be identified if equipped with automatic identification of outward dialing (AIOD).

The collection and magnetic tape storage of message detail record (MDR) data is important to many network customers, as it allows for equitable proration of telecommunications costs and supports network traffic engineering activities. MDR data can be accessed on-line for maintenance purposes. Referring to FIG. 7, the NCC collects MDR data in an MDR database 40 from all network node switches 10 and creates a single, uniformly formatted magnetic tape 41 convenient for off-line processing. The centralized collection of MDR records avoids the problems of physical transportation of locally created MDR tapes. A single tape eases the off-line merging problems, and a single format eases the off-line pre-processing problems. In case of a data link failure, data from a switch produced tape 42 can be entered through an MDR consolidation and reformatting module 43.

A report generation unit 45 produces an MDR summary report 49 to provide NCC operators with an overview of network traffic.

Figure 9:
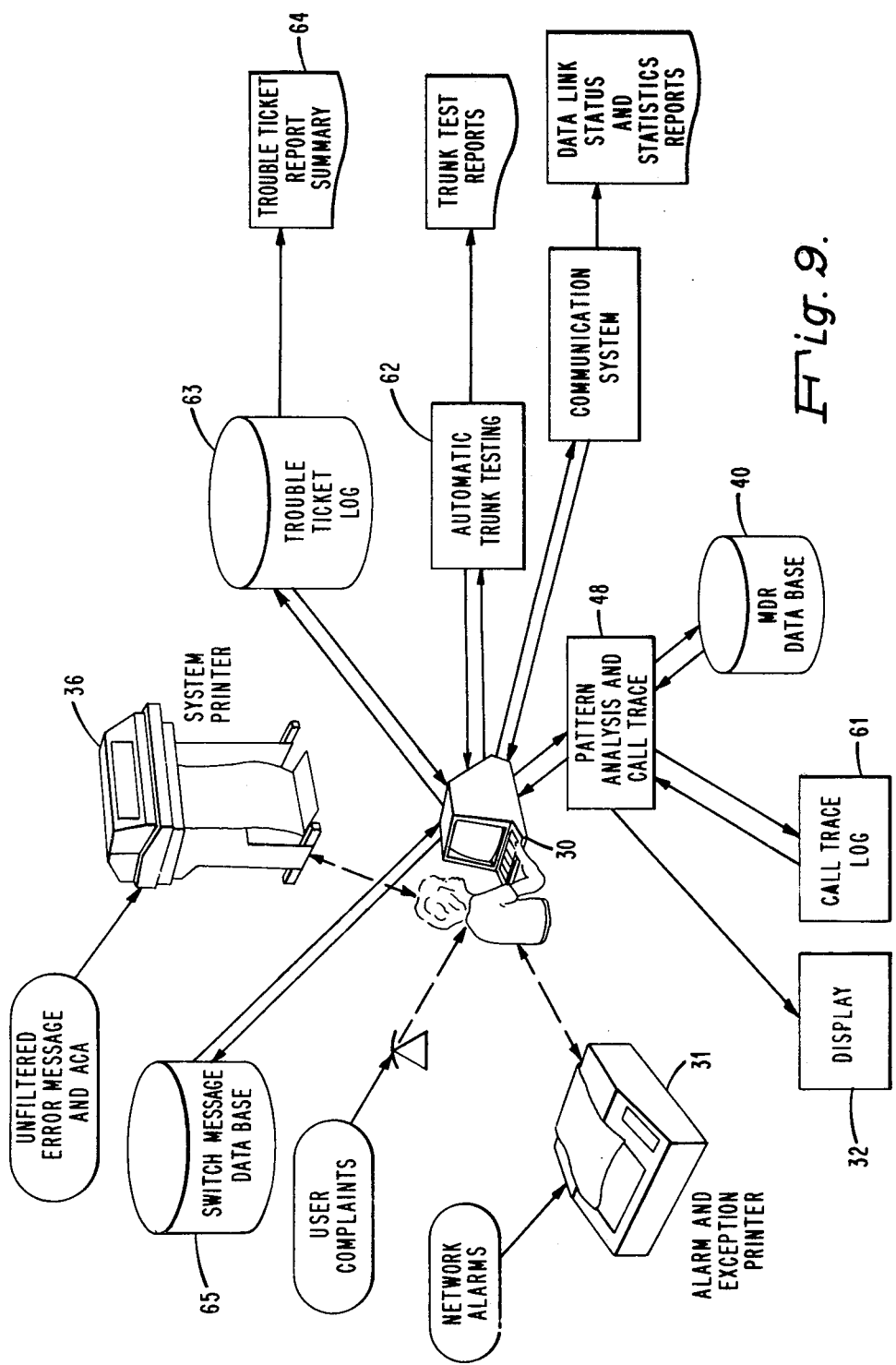
FIG. 9 illustrates the maintenance record keeping feature of the NCC.

With reference to FIG. 9, automatic circuit assurance (ACA) reports are sent by the tandem node switch 10 to the network control center, identifying trunks with either long or short holding times. These reports can also indicate trunk problems and can be used in conjunction with other NCC features to assist in localization of a problem.

The network control center makes valuable use of network user experience and complaints as a source of maintenance information. The NCC provides a call trace capability as well as database access to all past automatic circuit assurance reports and recent MDR records.

Figure 15:
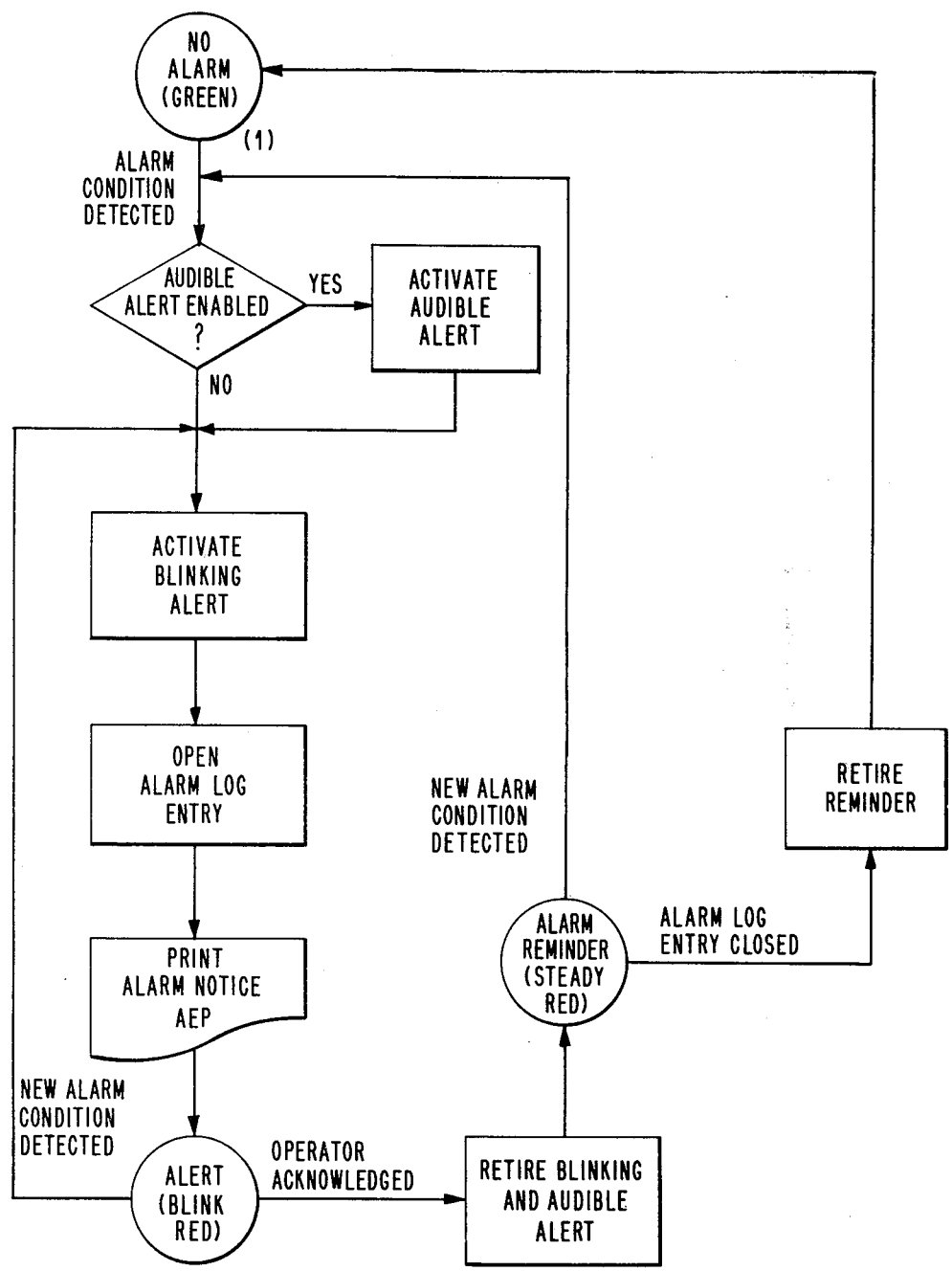
FIG. 15 is an alarm state diagram.

The NCC call trace feature would typically be used in response to a network user complaint. Complaints may result from noisy lines, insufficient volume, call cutoffs, etc. Based upon the called and calling number and the approximate time of the call, call trace will sort the MDR records and determine the exact circuit path (trunk group and circuit identification) taken by the call through any number of tandemed switches. FIG. 15 is an information flow diagram of the call trace feature. This information may be used to initiate further maintenance activity. The NCC also creates a log of all call traces and their results, which can be studies to identify facilities common to a number of complaints. The call trace log can often reveal an intermittent or subtle problem undetectable via other mechanisms.

To uncover problems not otherwise apparent, additional features allow an operator to selectively search a database of MDR records based upon time, date, switch, incoming or outgoing trunk, called or calling number, and/or call disposition. For example, a specific trunk can be examined for short holding times. Adjunct to these search/sort/select features (which can be applied to switch messages, MDR, ACA, and traffic data) is the capability of requesting printed reports of the results in operator-definable formats.

Figure 8:
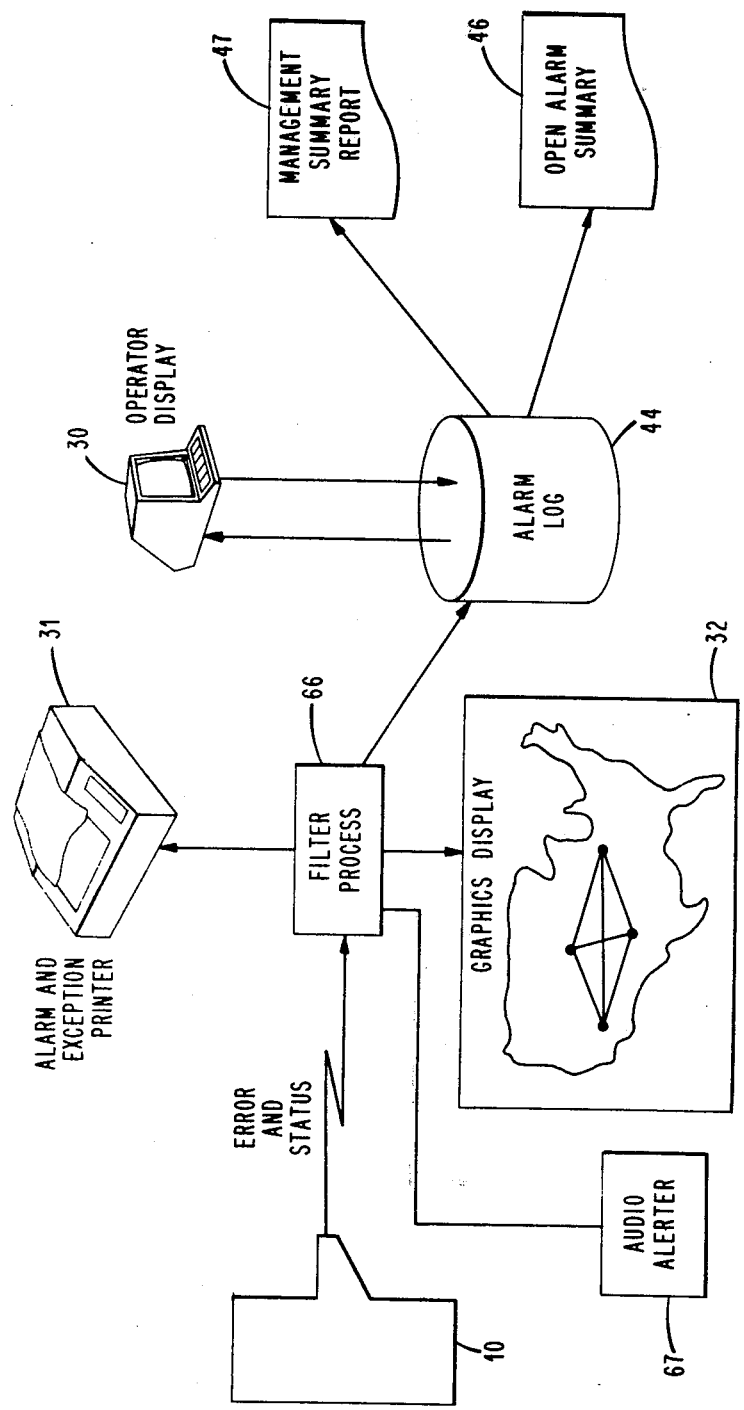
FIG. 8 diagrams the alarm detection feature of the NCC.

The network control center provides two powerful trouble tracking mechanisms: an alarm log and trouble tickets. These computerized facilities, illustrated in FIGS. 8 and 9, respectively, support the network operators and their management by simplifying and assisting in trouble followthrough. This avoids previous manual methods which were usually ad hoc and often incomplete.

In a centralized control center environment, the operator must be made aware of critical maintenance conditions rapidly. The network switches remote all maintenance information to the network control center. However, in a multiswitch network the volume of maintenance information (e.g., switch status and error messages) can be so large that critical messages get overlooked. To ensure that critical conditions are not overlooked, the NCC alarm feature identifies messages requiring immediate operator attention.

Every message from each tandem node switch in the network is transmitted by a computerized filter 66 to the NCC and compared with predefined alarm conditions. If there is a match, an alert is immediately generated and the alarm message is printed by the alarm and exception printer 31. Further, many categories of messages are not of alarm priority unless their frequency of occurrence reaches a certain threshold. This would apply, for example, to intermittent hardware or software failures. In such instances, the NCC also alerts the operator when a predefined frequency-of-occurrence threshold has been exceeded.

An alarm log 44 is a computerized database, automatically updated each time an alarm is detected by the NCC. Included in the alarm log format are the date and time of occurrence, switch identification, message type, status, alarm log entry number, and space for an operator-entered free-format text area. The operator is given wide-ranging ability to print, display or update alarm log entries at any time through the terminal 30.

To maintain visibility of alarms, there is a periodic open alarm summary report 46 which, on an operator-selected schedule, reminds him with a short summary of open alarms. Also provided is a printed management summary report 47 which, for a specified reporting period, summarizes the alarms opened and closed, and the dates and times of their opening or closing.

Analogous to the alarm tracking mechanism, the NCC provides a computerized trouble ticket log 63 to coordinate and track general troubles. The trouble ticket format, displayed upon operator request, provides a time, date and trouble ticket number field already entered by the system. In addition, there are fields for the switch identifier, the operator's name, the site telephone number, an area for trouble descriptions and a status field (open and closed). As with the alarm log, entries may be sorted by time, date, switch, trouble ticket number or status. Also provided is a printed trouble ticket summary report 64.

Both the alarm and trouble ticket management summary reports provide management with visibility and documentation of problems handled by the staff, and may be used as a gauge of switch and transmission performance.

Figure 10:
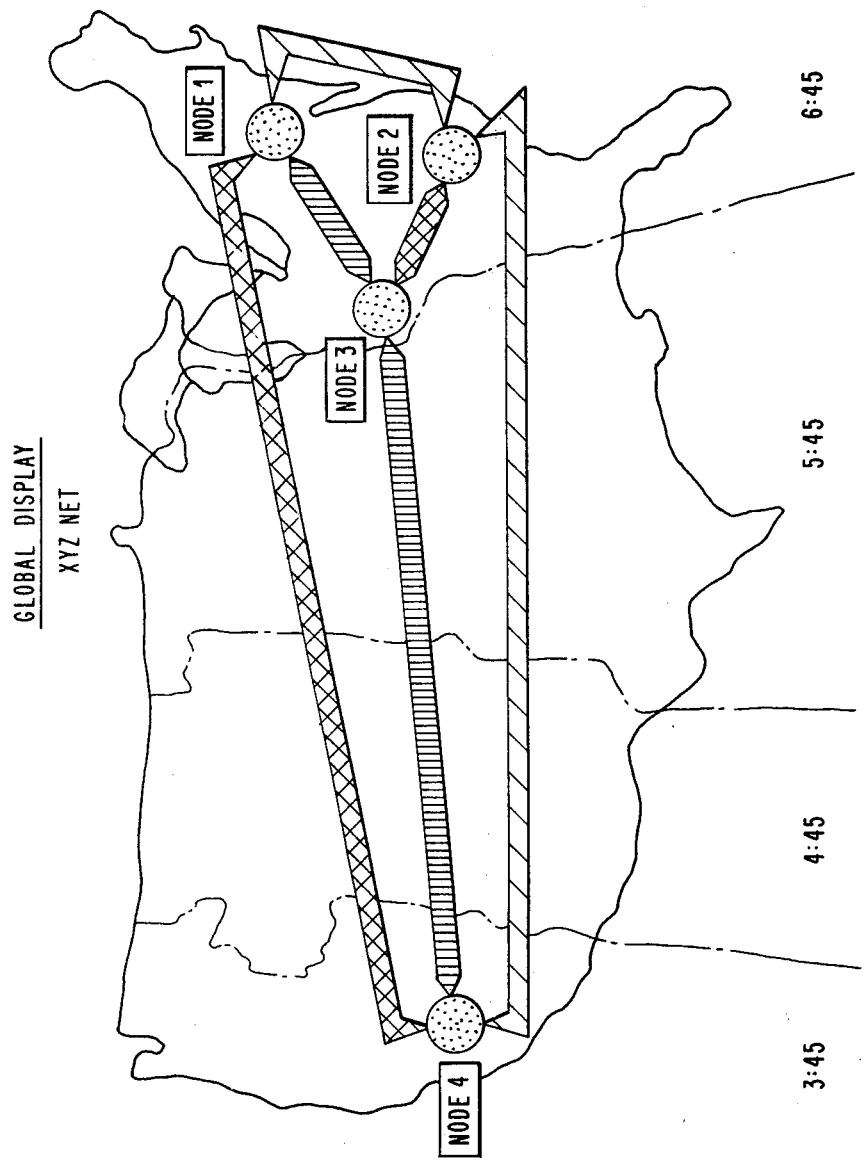
FIG. 10 is an example of a network map displayed at the NCC.
Figure 11:
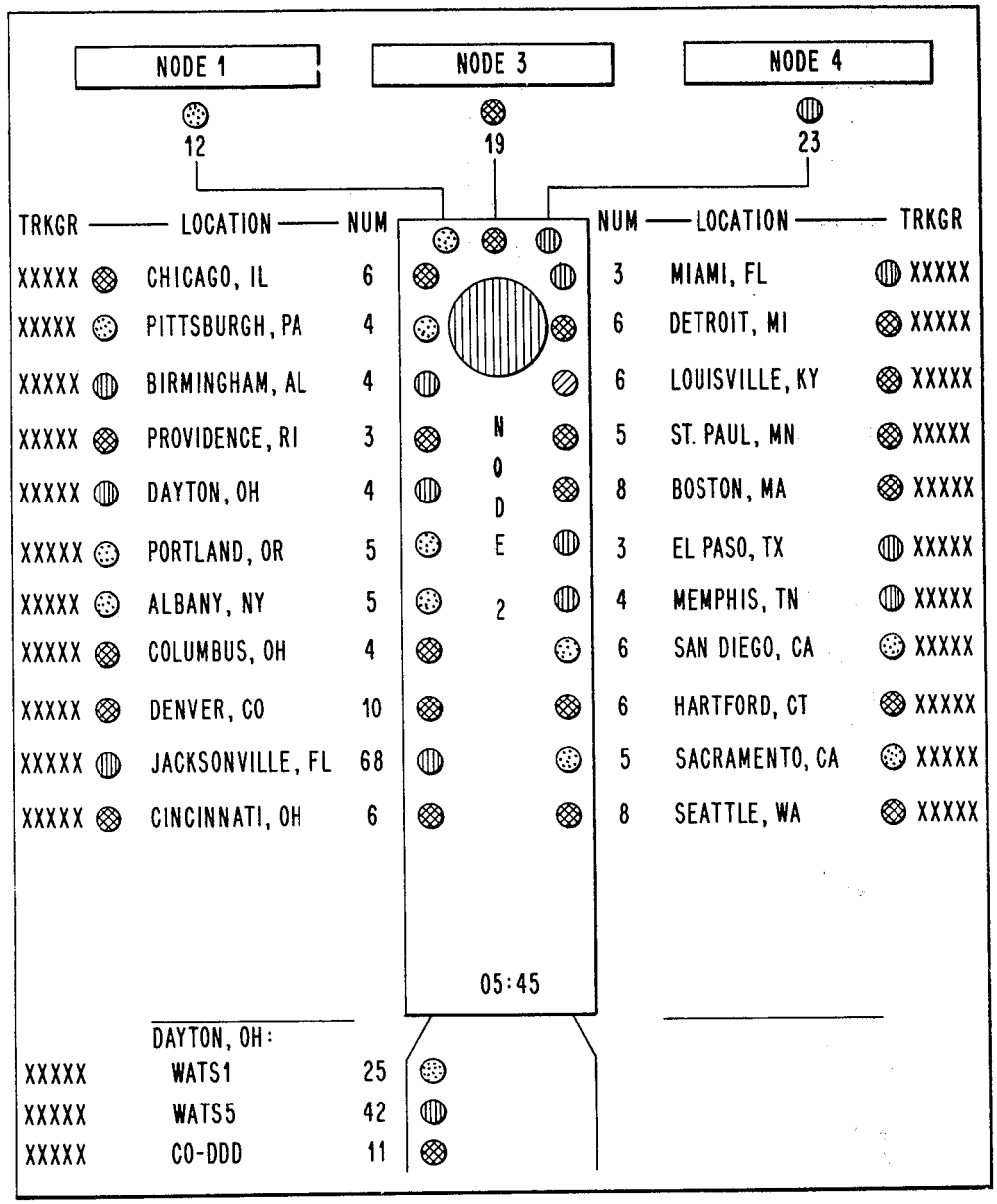
FIG. 11 is an example of a single-node format displayed by the NCC.
Figure 12:
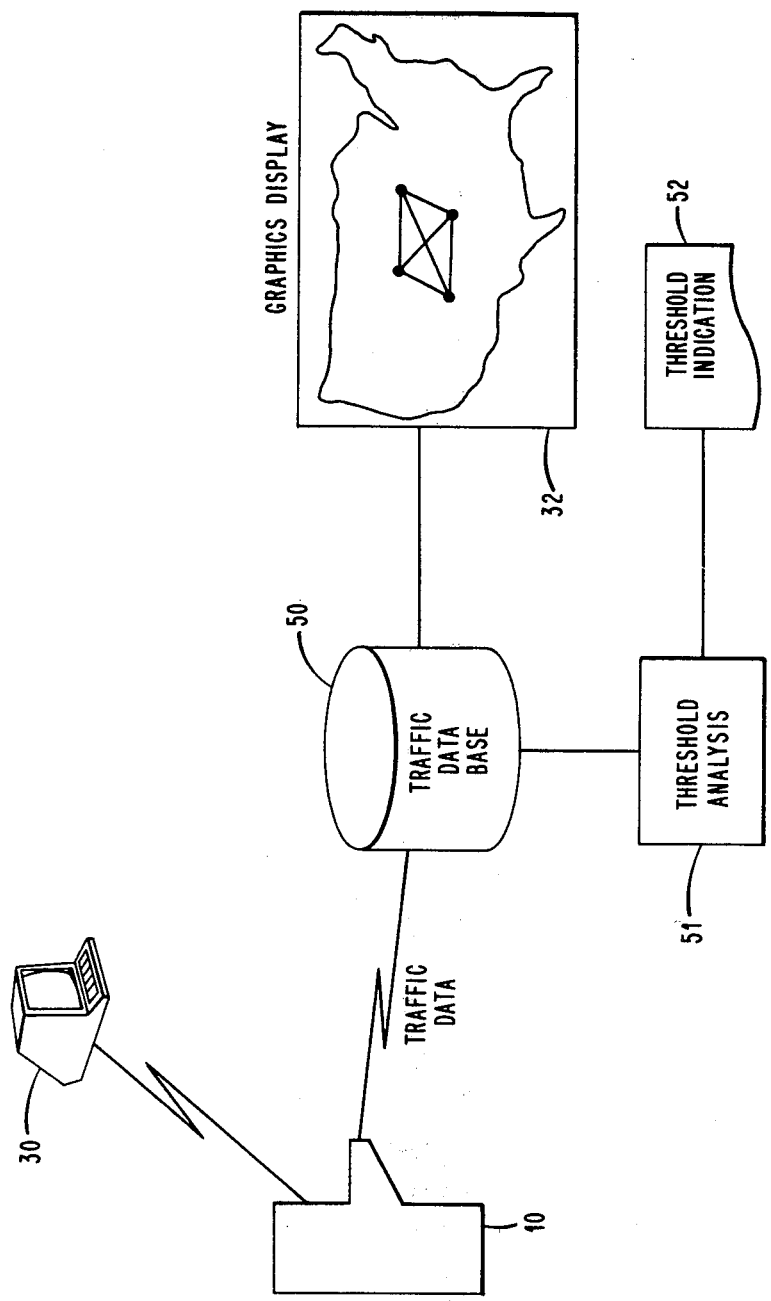
FIG. 12 is a schematic representation of the traffic monitoring feature of the NCC.

The graphics display 32 plays an integral part in monitoring and tracking both switch alarm messages and traffic conditions. The NCC operator can get a rapid overall impression of network traffic from a "global display", an example of which is illustrated by FIG. 10, or may choose instead to watch a single-node switch as illustrated by FIG. 11. The "single-node" images provide, at a glance, the alarm status at all nodes, traffic monitoring of all trunk groups connected to the node of interest, including IMTs, satellite PABX links (access lines), on-net and off-net access lines (DID, CO, FX, WATS), and other details concerning each of these trunk groups, such as number of circuits per group and vendor.

Network alarm status (and traffic) information is dynamically displayed via color graphics giving the operator an overview at a glance of current networks alarm status (and traffic conditions). This avoids the traditional deluge of rows and columns of numbers. The principal display consists of a geographic representation of all nodes and inter-machine trunks in the network. Immediate recognition of alarm conditions is assured by changing the node symbol of the affected mode from green to flashing red and sounding an audible alert which can only be silenced by operator acknowledgement. The node symbol is returned to green when the corresponding alarm is retired. The actual message which triggered the alarm is printed on the alarm and exception character printer 31. This is illustrated by alarm state diagram of FIG. 15.

The general usefulness and applicability of NCC features may best be seen through example. Suppose a PABX attendant calls the NCC operator indicating that a number of users have complained of noisy lines or interrupted calls when making calls to a particular network switch. The PABX attendant provides information regarding the called and calling numbers, and the NCC operator logs the trouble indications in a trouble ticket.

A variety of trouble conditions could exist at this point: the problem may be intermittent or stable, and may exist in the transmission or switching facility. Of course, intermittent problems are the most difficult to diagnose, and that is where the NCC features become most useful. The NCC operator has a variety of options at this point.

The operator would probably first examine past trouble tickets and alarm logs to see if the problem was already detected, or whether similar reports had been logged earlier. Depending on the circumstances, the operator may choose to initiate a call trace on one or several of the complainer's calls. The call trace will identify specific switch nodes, trunk groups and circuits involved in the call setups. The results of the call trace will enter the call trace log and common facilities may be identified. If a common trunk is found, the MDR database can be sorted to see if that particular trunk has recently experienced excessive numbers of short holding times. Abnormal holding times may also be found conveniently by sorting the ACA reports in the switch message database 65. The NCC operator could also initiate a trunk test to measure noise and gain or perhaps perform a maintenance call-through on the offending trunk. One or several of these features would identify a bad trunk. If a bad trunk is found, it may be taken out of service from the NCC. In any case, any action taken would be recorded in the trouble ticket.

Under different circumstances, the NCC operator may take a different course of action. If a switch problem instead of a trunk problem were suspected, the operator could examine the switch message database 65. The operator could select and retrieve the last maintenance summary report from a specific switch, or he might choose to see all maintenance messages from that switch for the last 30 minutes. In any case, the information is conveniently displayed. The operator may then choose to initiate a switch diagnostic. Depending on the results, the operator may transfer service to a redundant unit or put a unit out of service. If the problem were very serious, the operator could even re-route traffic to avoid the problem area. Again, actions taken would be tracked using the trouble ticket.

These are only simple examples of possible NCC activities. However, it is seen that from one central location, the NCC operator can localize a reported problem, effect required diagnostics, modify the switch hardware configuration, and, most important, provide a single maintenance contact for network users and provide coordination of repair efforts. The NCC thus provides a single center with overall maintenance responsibility.

Proper and efficient handling of non-alarm messages is also important. These messages afford the operator detailed monitoring of switch node status, and can assist in diagnostics and trouble localization. All messages from all switches are maintained in an NCC switch message database. The messages are easily accessible to the operator via database utility software capable of sorting and selecting by switch, time period, and message type (every message is assigned a message type code by the tandem node switch; some message types embrace broad categories of messages, while others are unique to a single message format). This powerful database capability is a significant improvement compared to approaches which involve manually scanning reams of printouts documenting the events at each switch from past hours or days. The chances of overlooking important symptoms are drastically reduced, and operator efficiency in correlating diverse events is greatly enhanced.

Continual traffic monitoring is necessary to ensure optimal traffic handling, especially during unusual conditions. The NCC gives the network operator timely traffic information and effective congestion relief tools. Traffic monitoring and control capabilities are particularly important in a private network, where economics dictate minimal trunk group sizings. In such finely optimized networks, localized problems can have network-wide consequences. For example, should a common carrier experience a broadband failure, all trunks in an intermediate trunk group between two switches may be disabled. The NCC operator would be rapidly alerted. The operator could temporarily cancel alternate routing from distant nodes which might normally be routed through the affected switches. This prevents distant traffic from entering the affected region and being blocked when it may have had other alternate routing possibilities (such as off-net routing). This mitigates the effect of a localized problem on network-wide traffic. Further, by preventing distant traffic from entering the affected region, local users have a greater opportunity for any remaining alternate paths.

Figure 13:
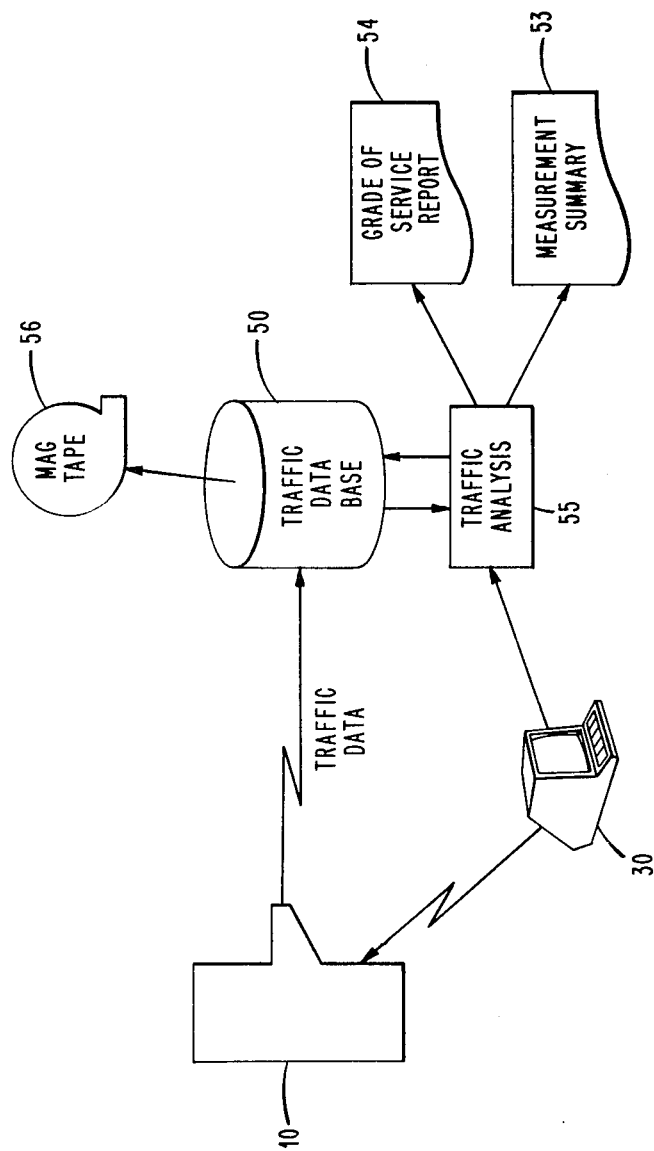
FIG. 13 is a schematic representation of the traffic analysis feature of the NCC.

The network control center monitors the traffic from each trunk group in the network on a near real-time basis. Referring now to FIG. 13, this is accomplished by each of the tandem node switch network switches sending "100-second scan" trunk usage information to the NCC. Specifically, the tandem node switches sample each trunk group and send information on the number of busy trunks to the NCC every 100 seconds. The information is stored in a traffic database 50 and processed by a threshold analysis unit 51.

The 100-second scan information immediately updates graphics displays. Specifically, inter-machine trunk group occupancy is shown on the "global" display (FIG. 10), and satellite PABX access line group occupancy and off-net line group occupancy are shown on a "single node" display (FIG. 11) available for each node. Colors are used to signify the level of trunk group occupancy in three arbitrary ranges; e.g., no traffic to moderate traffic (approximately 0-75% busy), heavy traffic (approximately 75-95% busy), and all-trunks-busy (ATB=100% busy). The graphics display 32 provides the operator with a rapid impression of the overall network traffic from the global display and traffic at particular nodes from the single-node displays.

Typically, all-trunks-busy (ATB) conditions are not considered anomalous until they persist for several consecutive 100-second scan intervals. Although the operator could visually monitor such circumstances on the graphics displays, this would be burdensome. Thus, a traffic threshold report 52 is printed which identifies trunk groups with more than a specified number of consecutive ATB 100-second scans to advise the NCC operator of significant ATB conditions.

The NCC operator is in a unique position: first, to decide if congestion relief action is warranted, and second, to take effective action when appropriate. Along with the traffic displays and threshold reports, the NCC operator also has other information which could bear on a potential traffic problem, such as maintenance status (both switch and trunk) and administrative information. If the operator decides to take action, available traffic control measures include:

1. Routing and translation table modification
2. Time-of-day routing
3. Alternate route controls
4. Route reservation controls
5. Code blocking
6. Queue control
7. Short register timing The operator can watch the results of the action taken on the graphics display 32. The graphics display system plays an integral part in monitoring and tracking both switch alarm messages and traffic conditions. The NCC operator can get a rapid overall impression of network traffic from the "global display", or may choose instead to watch a single node switch. The "single node" images provide at a glance the alarm status at all nodes, traffic monitoring of all trunk groups connected to the node of interest including IMTs, satellite PABX links (access lines), on-net and off-net access lines (DID, CO, FX, WATS), and other details concerning each of these trunk groups, such as number of circuits per group and vendor.

Network traffic engineering for optimum service at minimum cost requires considerable traffic data and sophisticated analysis. In most private networks, transmission facility costs dominate overall network costs. This makes providing the desired grade-of-service with the fewest trunks an important goal to the telecommunications manager. The first step toward this goal is to properly engineer the overall network; that is, to choose the proper number and location of network nodes, and properly dimension the interconnecting trunk groups, the satellite PABX trunk groups, off-net trunk groups, etc. Once the network is in place, initial traffic measurements are necessary to verify that the specified grade-of-service on each trunk group is achieved with minimum trunking. Following the initial traffic verification period, a plan of regular traffic measurements and trunk adjustments is required to accommodate changes in traffic patterns arising from network growth and other causes.

Referring to FIG. 13, the network control center provides a monthly grade-of-service report 54 which compares measured traffic statistics with the network design objectives for each trunk group, and makes a recommendation based on standard traffic engineering formulas of the number of circuits to add or remove to bring the group within objectives.

This report is derived by a traffic analysis unit 55 from traffic data routinely collected from all node switches. The traffic analysis unit 55 extracts trunk usage (in CCS) and event counts data from which busy-hour statistics are compiled and compared with the trunk-group design objectives. The trunk-group objectives are specified on a per-trunk-group basis and can be modified as appropriate. The busy-hour data and recommendations are made available at the end of each calendar month, along with the previous two months' recommendations. FIG. 16 is an information flow chart for this function.

To support off-line traffic data analysis, a traffic data tape 56 is also created at the NCC. The tandem node switch has an extensive repertoire of traffic-metering packages, including trunk usage and events (as mentioned), switch usage and events, load balancing, business service usage and events, load service indicators, inlet usage, customer service, MDR studies, and daily totals. These traffic packages can be initiated manually or scheduled on a periodic basis as measurement summary 57. In either case, the results of all traffic measurements are sent to the NCC, stored in the NCC database, made available to the operator, and placed on a traffic data magnetic tape for off-line processing.

The foregoing sections have been an overview of the telecommunication network including both the tandem node switches and the network control center. Some understanding of the system and its main components is necessary to appreciate the present invention which will now be described in more detail.

III. Call Trace

The call trace feature supplements existing maintenance systems and normal maintenance procedures. Even with current sophisticated maintenance systems and procedures, troubles can occur and not be detected. For example, an automatic trunk testing system 62 periodically samples transmission facilities (typically once per week per trunk) and is generally effective only for detecting steady-state degradations. Numerous, customer-irritating troubles could occur and virtually never be detected by the trunk testing system. However, by using customer complaints, troubles not detected by routine methods could be detected and the trouble source isolated.

The problem of responding to user complaints about network service is compounded by the fact that the complaint is usually made after the problem call has been completed when the precise route which the call took through the network may otherwise be difficult or impossible to recreate.

The call trace feature allows the NCC operator to request a search (and subsequent display) of the MDR database to determine the exact circuit path taken by a call through any number of tandem switches and trunks.

The call trace feature of the NCC uses caller complaints to isolate network performance impairments. The complaints are made to the network control center and may be the result of noisy lines, insufficient volume, call cut-off, inability to establish calls, etc.

The call trace feature utilizes a "system model" which incorporates a variety of explicit assumptions that will allow NCC system requirements to be determined.

After a single or multiple unsatisfactory calls or call attempts, it is assumed that the network customer (either the calling or called party) would complain to the NCC. It is further assumed that all complaints would be received within 30 minutes after the unsatisfactory call. Most complaints are assumed to be received almost immediately after the unsatisfactory call, however, at least two situations could delay the customer's complaint up to 30 minutes: First, a call is made which goes "High and Dry" (no ring-back signal nor busy signal given). The customer waits 30 minutes to retry the call and the same situation occurs again. The customer then immediately complains about both calls. A second situation may occur when a customer has an unsatisfactory first call and immediately retries the call and finds a satisfactory connection. The customer would not complain about the unsatisfactory first call until the conversation is complete, perhaps up to 30 minutes later. It is further assumed that an NCC operator is available to accept the complaint (i.e., the complaining party would not have to call back later), and it is assumed that the NCC operator will be able to enter the complaint information into the NCC within 30 minutes from receipt of the complaint. The sum of these two assumptions requires that the NCC has the ability to call trace all calls which occurred in the most recent 60 minutes.

It is assumed that there will be no more than two complaints per hour to the NCC. Nonetheless, to prevent entering the call trace data from being a burden to the NCC operator, the call trace data input is simple and takes less than 1.5 minutes to enter.

The MDR database, as seen in FIG. 7, comprises all the MDR data from each of the tandem switches involved in setting-up and/or completing the call(s) from the originating telephone number to the destination telephone number specified by the customer. The data collected for a particular complaint may contain information on several calls or call attempts depending on customer behavior.

The NCC operator calls for a computer generated call trace mask which is displayed on a terminal 30. The NCC operator enters into the call trace mask the originating telephone number, the destination telephone number and the customer estimate of the time the unsatisfactory call took place.

The fields used in the call trace mask are:
1. CUSTOMER NAME
2. DATE CALL WAS MADE
3. APPROX. TIME OF CALL
4. NUMBER CALLED
5. CALLING NUMBER
6. CALL MADE FROM OFF NET (Y or N)
7. CUSTOMER AUTH. CODE
8. NUMBER OF CALL ATTEMPTS
9. DATE OF TRACE
10. TIME OF TRACE.

The call trace mask arranges for automatic cursor advance to the next input field upon completion of the preceding field. If a "Y" is entered in the CALL MADE FROM OFF NET field the cursor moves to the CUSTOMER AUTH. CODE field, if an "N" is entered in the CALL MADE FROM OFF NET field, the cursor shall skip the CUSTOMER AUTH. CODE field and move to the NUMBER OF CALL ATTEMPTS field. DATE OF TRACE and TIME OF TRACE fields shall be system generated. If insufficient data is provided to perform a trace, an error message indicates that insufficient data was provided and shall indicate the additional data required to perform a trace.

Figure 14:
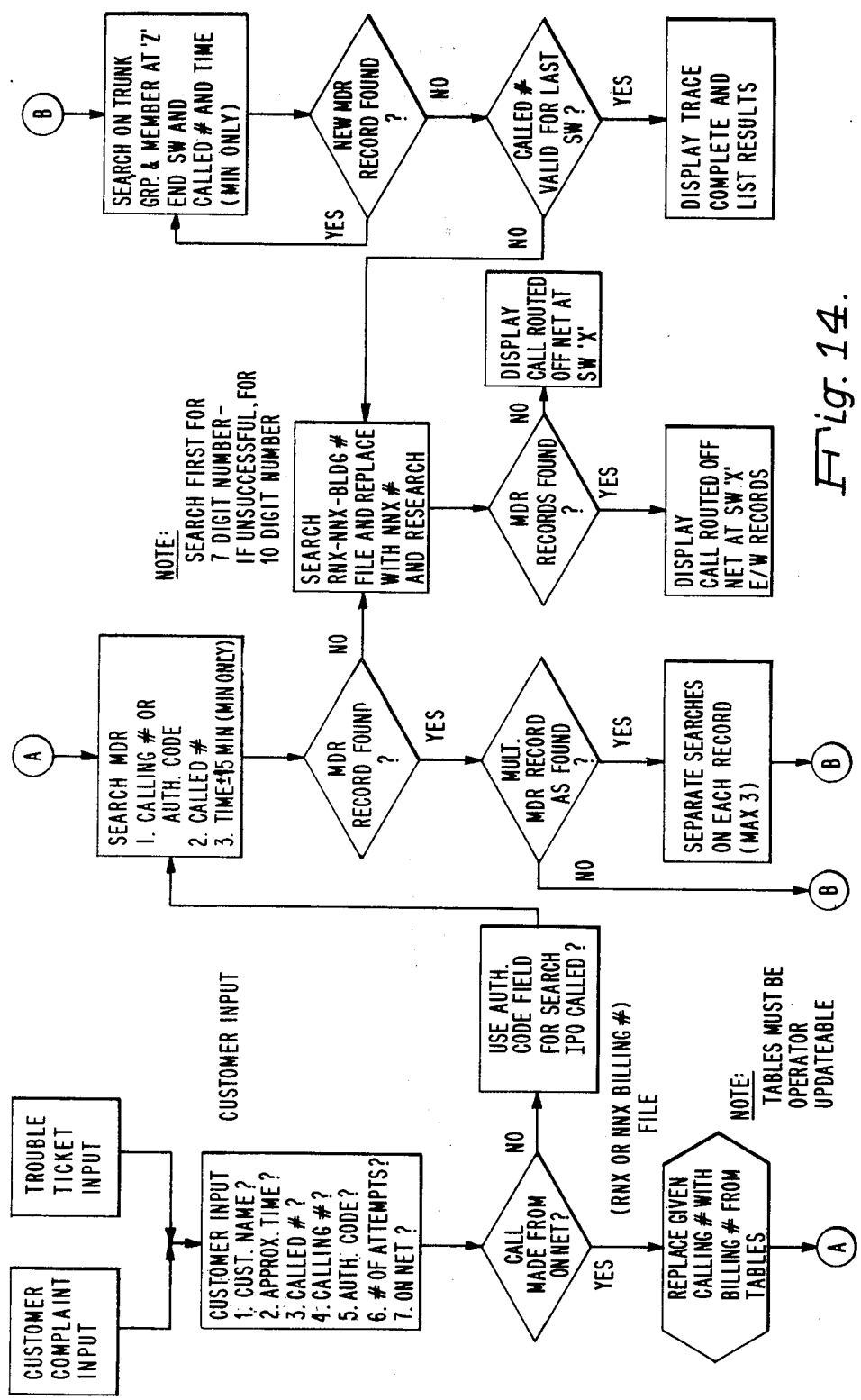
FIG. 14 is an information flow diagram for the call trace feature of the NCC.

The call trace operation is illustrated in the flow chart of FIG. 14 which is implemented by the pattern analysis and call trace unit 48, seen in FIG. 9.

All on-net locations have a seven digit number; RNX-XXXX. Off-net locations have ten digits; NPA-NNX-XXXX. RNX is the code for on-net switch; NPA-NNX is the area code and off-net code for a switch.

The tandem node switches may have a ten digit to/from seven digit translation capacity. Translation permits on-net calls to be routed off-net when necessary and off-net calls, which should be on-net, to be routed on-net.

If all network circuits connecting a tandem node switch and a PABX are busy, a call may be completed off-net on direct in dialing (DID) lines. In this situation the called PABXs seven digit on-net number RNX-XXXX is translated by the last on-net tandem node switch to its ten digit off-net number NPA-NNX-XXXX.

Each on-net location may have three corresponding number, an on-net number (RNX), an off-net number (NNX), and a billing number. These numbers are kept in a look-up table known as the RNX=NNX=BILLING NUMBER file which may be stored on discs 29.

We recall that upon completion of a call which passes through the network, each of the involved tandem node switches creates message detail record (MDR) data which identifies the called number, the incoming and outgoing trunk groups and circuit number, authorization code (if applicable), the date, beginning and completion times, and call disposition. In the case of an originating node, the call number on the tandem node switch or the access line from a satellite PABX would be identified. A station on a remote PABX could also be identified if equipped with automatic identification of outward dialing (AIOD). The NCC collects and stores the MDR data in an MDR database. The computer processor 28 searches the MDR database for pertinent MDRs.

If the call is not made from on-net, the search parameters for locating the first pertinent MDR are: customer authorization code, called number and the approximate time of the call. If the call is made from on-net, the calling number will be compared with the RNX=NNX=BILLING NUMBER file to insure that the calling number is a valid billing number. If the number provided is an RNX or NNX number, the proper billing number is substituted and this valid calling number, the called number and the approximate time of call are the search parameters for the first MDR record. All number searches are performed first for seven digits and then, if unsuccessful, for ten digits.

If no MDR record is found, the called number is replaced with the equivalent NNX number from the RNX=NNX=BILLING NUMBER file and another search is performed. If this search locates an MDR record, that record is displayed with the message CALL ROUTED OFF NET AT SWITCH X (X=The switch number for the switch that created the MDR record). If this second search still does not result in an MDR record being found CALL ROUTED OFF NET AT SWITCH X—NO RECORD AVAILABLE is displayed (X=The originating station home tandem switch number).

If the initial search on the calling number, the called number, and the approximate time is successful in locating MDR records, it is possible that more than one record may be found. This can occur if multiple attempts to complete the call were made by the caller before a successful call was placed. In this situation, the trace is performed on each call record up to a maximum of three records.

Once the individual MDR record used for each trace has been isolated, the called number, time of call, and outgoing trunk group and member are used as search parameters for an MDR record showing that trunk group and member number as the incoming trunk at the "Z" end of the trunk group switch.

If this search results in finding a new record, the outgoing trunk group and member number, the called number, and the time of the call are again used as search parameters as described in the preceding paragraph. This search routine continues until the search is unsuccessful.

When an unsuccessful search is performed, the RNX of the called number is compared with the valid RNX codes for the last tandem. If the RNX is valid for that switch, the results are listed with the message TRACE COMPLETE. If the RNX is not valid for that switch, the called number is replaced with the equivalent NNX number from the RNX=NNX=BILLING NUMBER file and another search is performed. In this search locates an MDR record, all records are displayed with the message CALL ROUTED OFF NET AT SWITCH X (X=The switch number for the switch that created the last MDR record). If this second search does not result in an MDR record being found CALL ROUTED OFF NET AT SWITCH X (X=The switch number for the switch that created the last MDR record found) is displayed along with the MDR records found up to that point.

The call trace routine described above is able to be initiated from the trouble ticket mask described in copending patent application (D-24,856). An entry of "Y" in the trouble ticket field CALL TRACE REQUIRED (Y or N) causes the required data for a call trace to be obtained from the appropriate trouble ticket fields and a trace performed simultaneously with the operator completing the remainder of the trouble ticket. If insufficient to perform a call trace is present on the trouble ticket an error message indicates that insufficient data was provided and indicates the additional data required to perform the trace.

A display from the call trace procedure is made available on hard-copy within 5 minutes. The call trace report format is self-explanatory, indicating the input parameters, and containing all the MDR data available pertaining to the particular complaint.

The MDR data extending 15 minutes before to 15 minutes after the estimated time of the call is reviewed.

A call trace graphic layout may be used in addition to listing the MDR records located in the trace. This graphic layout is an accurate graphic representation of the actual route that the call took as it passed through the network. Each trunk group is identified by trunk group and trunk numbers and each switch location is identified by switch number. With each individual circuit identified, the NCC operator can use other NCC tools (e.g., the automatic trunk test system 62) to isolate the problem and take corrective action.

The NCC operator requests switch status information and/or initiates automatic trunk testing to attempt to learn the source of trouble. If the problem source is found, appropriate repair activities would be started. However, if the problem is not found in this fashion, the call trace feature allows trouble isolation another fashion. A call trace log 61 of all customer complaints is kept with a list of the potentially troubled facilities. By looking for common facilities in the log, the NCC operator can spot the likely trouble source.

All call trace data is entered into a the call trace log 61. The call trace log will have all the MDR data collected from each complaint from the most recent 40 days. The operator shall provide updates describing action taken. A call trace log entry consists of the following items:

| ITEM | SOURCE |
| --- | --- |
| Call Trace Parameters (Called and Calling Number, Time of Day) | MDR |
| Trunk Identifiers | MDR |
| Switch Identifiers | MDR |
| Description of Problem and Action Taken | Operator |
| Originator of Call Trace | Operator |

The operator has the capability to select data from the call trace log 61 for printout or display using any combination (or subset) of the following parameters:

reporting period (two dates and times); trunk identifiers; switch identifiers.

While there has been shown and described what is at present considered the preferred embodiment of the invention, it will be obvious to those skilled in the art that various changes and modifications may be made therein without departing from the scope of the invention as defined by the appended claims.

We claim:

1. In a telecommunication system having a plurality of tandem node switches interconnected by a plurality of trunks and a network control center, a call trace system for identifying the circuit path taken from a calling number to a called number, comprised of:
    means associated with each tandem node switch to transmit message detail records, including calling or called number, incoming or outgoing trunks or circuits, date, time, and disposition of call, to the network control center;
    means to store message detail records in a database;
    means for searching said database for message detail records pertaining to the calling number or the called number during a time period;
    means for listing the pertinent message detail records found in the search; and
    means to translate said message detail records into a graphical representation of the route the searched call took as it passed through network.

2. In a telecommunication system having a plurality of tandem node switches interconnected by a plurality of trunks and a network control center, a call trace system for identifying the circuit path taken from a calling number to a called number, comprised of:
    means associated with each tandem node switch to transmit message detail records, including calling or called number, incoming or outgoing trunks or circuits, date, time, and disposition of call, to the network control center;
    means to store message detail records in a database;
    means for searching said database for message detail records pertaining to the calling number or the called number during a time period;
    means for listing the pertinent message detail records found in the search; and
    a terminal coupled to said search means to generate a call trace mask on said terminal, prompting an operator to enter data for searching said message detail records.

3. In a telecommunication system having a plurality of tandem node switches interconnected by a plurality of trunks and a network control center, a call trace system for identifying the circuit path taken from a calling number to a called number, comprised of:
    means associated with each tandem node switch to transmit message detail records, including calling or called number, incoming or outgoing trunks or circuits, date, time, and disposition of call, to the network control center;
    means to store message detail records in a database;
    means for searching said database for message detail records pertaining to the calling number or the called number during a time period; and
    means for listing the pertinent message detail records found in the search;
    wherein the trunk or circuit information of a pertinent message detail record is used as the basis for further message detail record searching.

4. In a telecommunication system having a plurality of tandem node switches interconnected by a plurality of trunks and a network control center, a call trace system for identifying the circuit path taken from a calling number to a called number, comprised of:
    means associated with each tandem node switch to transmit message detail records, including calling or called number, incoming or outgoing trunks or circuits, date, time, and disposition of call, to the network control center;
    means to store message detail records in a database;
    means for searching said database for message detail records pertaining to the calling number or the called number during a time period;
    means for listing the pertinent message detail records found in the search; and
    a table of corresponding on-net numbers, off-net numbers and billing numbers; and wherein
    said searching means first looks up the billing number corresponding to a called number or a calling number and then searches for a message detail record containing that billing number.

5. The call trace system of claim 4 wherein said searching means is arranged to search for a message detail record for a corresponding off-net number if no message detail record is found with a billing number.

6. A call trace system for a telecommunication network of tandem node switches comprised of:
    means associated with each tandem node switch for generating a message detail record of each call involving that switch, including called or calling number, incoming and outgoing trunks or circuits, date, time, and disposition of the call;
    means for collecting and storing said message detail records in a database;
    searching means for searching said database for message detail records pertaining to a specific call; and
    means for displaying message detail record data pertaining to a specific call;
    means to translate said message detail records into a graphical representation of the route the searched call took as it passed through network.

7. A call trace system for a telecommunication network of tandem node switches comprised of:
    means associated with each tandem node switch for generating a message detail record of each call involving that switch, including called or calling number, incoming and outgoing trunks or circuits, date, time, and disposition of the call;
    means for collecting and storing said message detail records in a database;
    searching means for searching said database for message detail records pertaining to a specific call; and
    means for displaying message detail record data pertaining to a specific call; and
    a terminal coupled to said search means to generate a call trace mask on said terminal, prompting an operator to enter data for searching said message detail records.

8. A call trace system for a telecommunication network of tandem node switches comprised of:
    means associated with each tandem node switch for generating a message detail record of each call involving that switch, including called or calling number, incoming and outgoing trunks or circuits, date, time, and disposition of the call;
    means for collecting and storing said message detail records in a database;

searching means for searching said database for message detail records pertaining to a specific call; and means for displaying message detail record data pertaining to a specific call;

wherein the trunk or circuit information of a pertinent message detail record is used as the basis for further message detail record searching.

9. A call trace system for a telecommunication network of tandem node switches comprised of:

means associated with each tandem node switch for generating a message detail record of each call involving that switch, including called or calling number, incoming and outgoing trunks or circuits, date, time, and disposition of the call;

means for collecting and storing said message detail records in a database;

searching means for searching said database for message detail records pertaining to a specific call; and means for displaying message detail record data pertaining to a specific call; and a table of corresponding on-net numbers, off-net numbers and billing numbers; and wherein said searching means first looks up the billing number corresponding to a called number or a calling number and the n searches for a message detail record containing that billing number.

10. The call trace system of claim 9 wherein said searching means is arranged to search for a message detail record for a corresponding off-net number is no message detail record is found with a billing number.

11. A telecommunication network comprised of:

a plurality of tandem node switches;

trunk groups interconnecting the tandem node switches;

said tandem node switches including means for generating a message detail record for each call passing through a switch, said record including switch identification, calling or called number, trunks or circuits involved, date, time, and disposition of a call;

a network control center in communication with the tandem node switches and including means to collect and store message detail records in a database;

searching means for searching said database for message detail records pertinent to a specific call;

means for displaying data of the message detail records pertaining to a specific call; and means to translate said message detail records into a graphical representation of the route the searched call took as it passed through network.

12. A telecommunication network comprised of:

a plurality of tandem node switches;

trunk groups interconnecting the tandem node switches;

said tandem node switches including means for generating a message detail record for each call passing through a switch, said record including switch identification, calling or called number, trunks or circuits involved, date, time, and disposition of a call;

a network control center in communication with the tandem node switches and including means to collect and store message detail records in a database;

searching means for searching said database for message detail records pertinent to a specific call;

means for displaying data of the message detail records pertaining to a specific call; and a terminal coupled to said search means to generate a call trace mask on said terminal, prompting an operator to enter data for searching said message detail records.

13. A telecommunication network comprised of:

a plurality of tandem node switches;

trunk groups interconnecting the tandem node switches;

said tandem node switches including means for generating a message detail record for each call passing through a switch, said record including switch identification, calling or called number, trunks or circuits involved, date, time, and disposition of a call;

a network control center in communication with the tandem node switches and including means to collect and store message detail records in a database;

searching means for searching said database for message detail records pertinent to a specific call;

means for displaying data of the message detail records pertaining to a specific call;

wherein the trunk or circuit information of a pertinent message detail record is used as the basis for further message detail record searching.

14. A telecommunication network comprised of:

a plurality of tandem node switches;

trunk groups interconnecting the tandem node switches;

said tandem node switches including means for generating a message detail record for each call passing through a switch, said record including switch identification, calling or called number, trunks or circuits involved, date, time, and disposition of a call;

a network control center in communication with the tandem node switches and including means to collect and store message detail records in a database;

searching means for searching said database for message detail records pertinent to a specific call;

means for displaying data of the message detail records pertaining to a specific call; and a table of corresponding on-net numbers, off-net numbers and billing numbers; and wherein said searching means first looks up the billing number corresponding to a called number or a calling number and then searches for a message detail record containing that billing number.

15. The telecommunication network of claim 14 where said searching means is arranged to search for a message detail record for a corresponding off-net number if no message detail record is found with a billing number.

* * * * *